United States Patent [19]
Areaux

[11] Patent Number: 5,919,283
[45] Date of Patent: Jul. 6, 1999

[54] METHOD AND APPARATUS FOR INTRODUCING METAL CHIPS INTO MOLTEN METAL BATH

[75] Inventor: Larry D. Areaux, Buena Vista, Colo.

[73] Assignee: Premelt Pump, Inc., Kalamazoo, Mich.

[21] Appl. No.: 08/743,721

[22] Filed: Nov. 6, 1996

[51] Int. Cl.⁶ .................................................. C22B 9/16
[52] U.S. Cl. ............................... 75/571; 75/581; 75/583; 75/602; 75/621; 75/686; 75/687; 75/708; 420/590; 266/207
[58] Field of Search ............................. 75/708, 580, 581, 75/602, 621, 686, 687, 571, 583; 420/590; 266/207

[56] References Cited

U.S. PATENT DOCUMENTS 5,203,910  4/1993  Areaux et al. ............................. 75/708
5,211,744  5/1993  Areaux et al. ........................... 266/205

*Primary Examiner*—Melvyn Andrews
*Attorney, Agent, or Firm*—The Firm of Gordon W. Hueschen

[57] ABSTRACT

An inert gas bubble-actuated molten metal pump is located between one section of a metal-melting furnace and a second section to pump molten metal from the one section, wherein the molten metal is at a higher temperature, into the second section, wherein the molten metal is at a lower temperature, and its effluent is directed into contact with metal chips being charged into the second section, thereby assisting in the more rapid melting of the chips into the molten metal mass in the second section. The inert gas employed to actuate the molten metal pump is captured beneath a heat-resistant and flame-resistant cover located above the exit port of the pump and over a substantial portion of the molten metal mass in the second section, thereby providing a non-oxidizing atmosphere at the surface of the molten metal mass or pool beneath said cover. In this manner the inert gas is employed not only to actuate the inert gas bubble-actuated molten metal pump, but also to assist in the rapid melting of metal chips being charged, as well as to provide a non-oxidizing atmosphere at the surface of the molten metal.

21 Claims, 2 Drawing Sheets

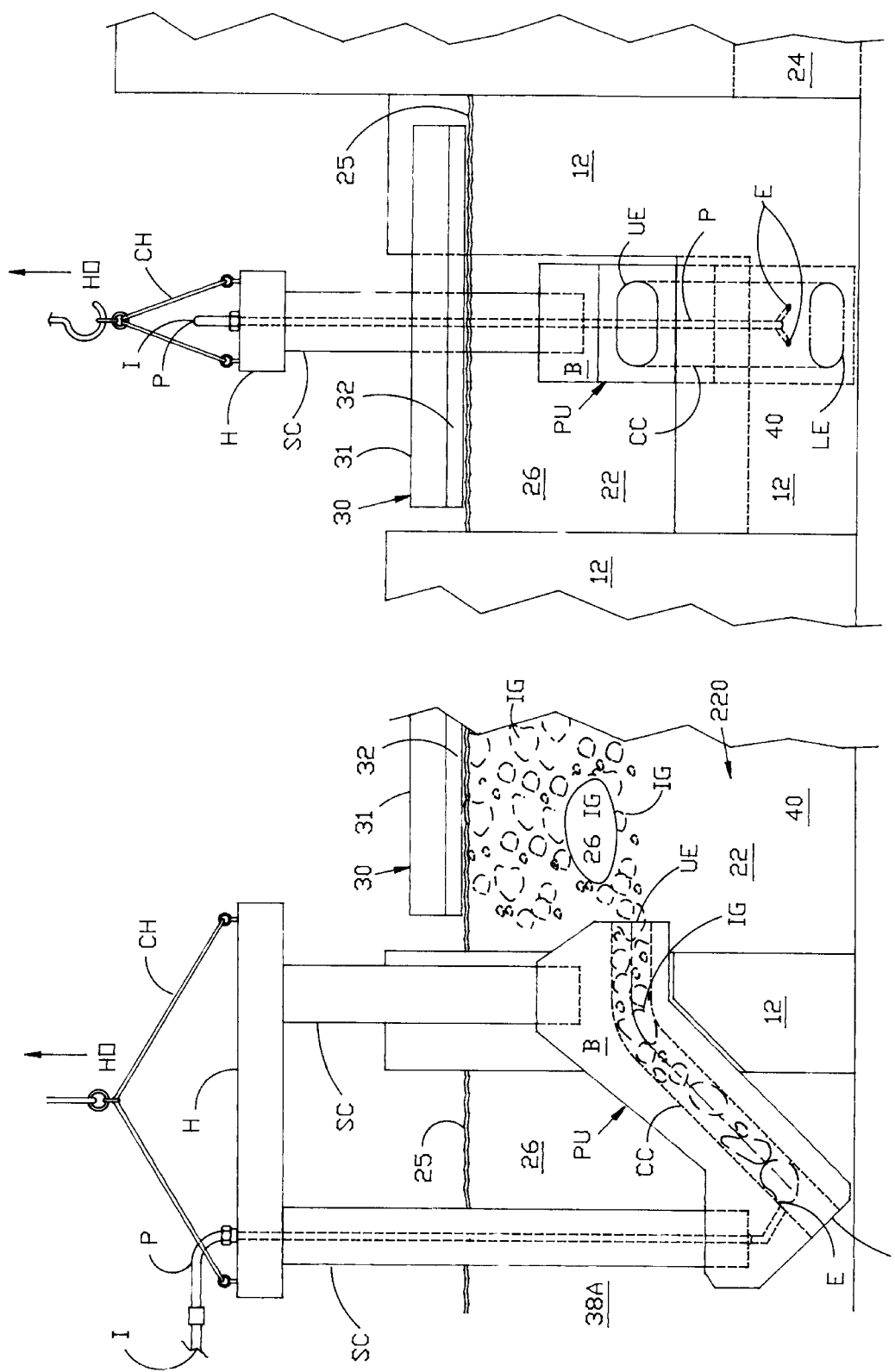

METHOD AND APPARATUS FOR INTRODUCING METAL CHIPS INTO MOLTEN METAL BATH

BACKGROUND OF THE INVENTION

1. Field of the Invention

Use of an inert gas bubble-actuated molten metal pump to convey hotter molten metal and thereby assist in rapid melting of metal chips introduced into cooler molten metal in a metal-melting furnace and, in combination with a heat-and flame-resistant cover, simultaneously to provide a non-oxidizing atmosphere at the surface of the molten metal mass, thereby also to attain maximum economic utilization of the inert gas.

2. Prior Art

The state of the art regarding the introduction of metal chips into the charge well of a metal melting furnace and the conveyance of molten metal from one place to another within or out of a metal melting furnace has been fully reviewed in my prior U.S. patents, namely, U.S. Pat. Nos. 4,702,768, 4,710,126, 4,721,457, 4,872,907, 5,211,744, 5,203,910, 5,403,381, 5,468,280 and 5,407,462, the disclosures of which patents are incorporated herein by reference.

In particular, the employment of an inert gas bubble-actuated molten metal pump for moving molten metal from one place to another in a metal-melting furnace or out of a metal melting furnace has been disclosed in my prior U.S. Pat. No. 5,203,910 as well as in my U.S. Pat. Nos. 5,403,381 and 5,468,280. A heat- and flame-resistant cover for at least a substantial portion of a charge well has been disclosed in my U.S. Pat. No. 5,211,744. Various methods and charger means for introducing metal chips into the charge well of a metal-melting furnace have been disclosed in my prior U.S. Patents, in particular a stripforming briquetter device and method in my prior U.S. Pat. No. 4,702,768, a compacting extruder method and means in my prior U.S. Pat. No. 4,872,907, and a mass flow gravity feed method and apparatus for charging metal chips into the charge well of a metal-melting furnace in my prior U.S. Pat. No. 5,407,462.

Although the inventions of these prior patents have gone far in advancing the state of the art, including the efficiency of charging metal chips into the charge well of a metal-melting furnace and the conveyance of molten metal from one place to another in a metal melting furnace or out of the metal-melting furnace, an improvement in the efficiency is always a highly-desirable objective and one which is fulfilled admirably by the provision of the present invention whereby certain of the salient features of my prior inventions and patents are combined in a manner which minimizes unnecessary losses of inert gas employed in the inert gas bubble-actuated molten metal pump, utilizes the temperature gradient between different sections of a metal-melting furnace together with such an inert gas bubble-actuated molten metal pump to assist in the more rapid melting of metal chips charged into the charge well of a metal-melting furnace and into the molten metal mass therein, and at the same time utilizes the propellant or actuator inert gas from the inert gas bubble-actuated molten metal pump, in combination with a heat-resistant and flame-resistant cover over at least a substantial portion of the surface of the molten metal mass in a charge well, to capture the inert gas used as actuator beneath such a cover at the surface of the molten metal mass in the charge well, the combination of the various aspects of the invention as set forth hereinbefore increasing greatly the efficiency of the operation by an astute combination of the heat gradient between wells, the pump, the inert gas bubbles actuating the pump, and the cover, all together contributing to elevate the efficiency and economy of the operation to new and previously unattainable heights.

It goes without saying that it is not essential that the hotter molten metal be conveyed from an adjacent well into a charge well of a metal-melting furnace, so long as hotter molten metal is conveyed from one section of the metal melting furnace into a second section of the metal melting furnace containing cooler molten metal into which a new charge of chips is being introduced, and it should be clear that these two (2) sections could involve two (2) separate wells of the furnace or be present in the same well of the metal-melting furnace.

As used herein, the term "actuated", with reference to the inert gas bubble "actuated" molten metal pump, means that the pump is put into action by the inert gas. Synonymously, the pump could be said to be driven, propelled, or powered by the inert gas bubbles.

OBJECTS OF THE INVENTION

It is an object of the present invention to provide a new and improved method for the utilization of metal chips including scraps by charging of the same into a section of a metal-melting furnace containing cooler molten metal which involves feeding the metal chips into that section of the furnace, covering at least a substantial portion of the surface of the molten metal in that section of the furnace with a heat-resistant and flame resistant cover, bringing hotter molten metal from another section of the furnace into the section which contains the cooler molten metal and into which the metal chips are being introduced (usually into the charge well from a well adjacent to the charge well), and directing the hotter molten metal upon the metal chips to assist the more rapid melting thereof into the molten metal mass in that section of the furnace, the conveyance of the hotter molten metal from the hotter to colder sections being effected by an inert gas bubble-actuated molten metal pump, and the inert gas used for such actuation being captured at the surface of the molten metal beneath the said cover there provided above the exit port of the said pump so as to provide a non-oxidizing atmosphere at the surface of the molten metal. Another object of the invention is to provide for more efficient melting of a new charge of chips into the molten metal mass in the furnace. A further object is to provide a non-oxidizing atmosphere at the surface of the molten metal in the furnace. An additional object of the invention is to provide for improved and more efficient utilization of the inert gas employed in the form of bubbles for actuation of the molten metal pump, which is no longer wasted but which is utilized to provide a non-oxidizing atmosphere at the surface of the molten metal. Still another object of the invention is to provide an efficient method for utilizing the gradient between the higher temperature of the molten metal in one section of a metal-melting furnace and the lower temperature of the molten metal in another section of the metal-melting furnace into which a new batch of chips is being charged. Still other objects of the invention will become apparent hereinafter, and yet other objects will be obvious to one skilled in the art to which this invention pertains. All of these objects of the invention are in fact attained by provision of the method and the specific combination of apparatus of the present invention.

SUMMARY OF THE INVENTION

What I believe to be my invention, then, inter alia, comprises the following, singly or in combination:

A method comprising the following steps: providing an inert gas bubble-actuated molten metal pump in a section of a metal-melting furnace containing hotter molten metal, and providing a section of a metal-melting furnace containing cooler molten metal, directing hotter molten metal emerging from the pump into contact with a charge of metal chips being introduced into the cooler molten metal to assist in more rapid melting of the chips, providing a heat-resistant and flame-resistant cover above the exit port of said pump and over at least a substantial portion of the molten metal into which the chips are being charged, and capturing inert gas used as actuating agent in the molten metal pump beneath said cover to provide a non-oxidizing atmosphere at the surface of said molten metal into which said chips are being charged and beneath said cover; such a method comprising the following steps: providing an inert gas bubble-actuated molten metal pump between a first section of a metal-melting furnace which contains hotter molten metal, and a second section of a metal-melting furnace containing cooler molten metal, directing hotter molten metal emerging from the pump from said first section into contact with a charge of metal chips being introduced into said second section to assist in more rapid melting of the chips, providing a heat-resistant and flame-resistant cover above the exit port of said pump and over at least a substantial portion of the molten metal in the second section, and capturing inert gas used as actuating agent in the molten metal pump beneath said cover to provide a non-oxidizing atmosphere at the surface of said molten metal in said second section and beneath said cover; such a method wherein the pump comprises an elongated conveying conduit having a lower end and an upper end, at least a portion of said conduit being inclined upward from the horizontal; such a method wherein flow of molten metal in said conveying conduit is effected by means of inert gas introduced into said conveying conduit at or adjacent its lower end and rising up the incline therein to emerge at its upper end; such a method wherein said pump is set in a wall between a charge well and an adjacent well in said metal-melting furnace; such a method wherein said pump is set at an angle in an opening in said wall with its lower end submerged in molten metal in said adjacent well and its upper end in molten metal in said charge well; such a method wherein said elongated conveying conduit is angled with an upper portion substantially horizontal and a lower portion extending downwardly at an angle to the horizontal; such a method wherein the molten metal and the metal chips charged into the charge well comprise aluminum, magnesium, titanium, brass, iron, or steel, or an alloy thereof, or a metal for alloying one of said metals; such a method wherein the charge of metal chips is provided by a mass flow gravity feed metal chip charger.

Moreover, in a metal-melting furnace, the following combination:

a section containing hotter molten metal, a section containing cooler molten metal, an inert gas bubble-actuated molten metal pump, having an inlet end in said hotter molten metal and an outlet end in said cooler molten metal, located between the said two sections of said metal-melting furnace, a metal chip charger for introducing metal chips into the section containing said cooler molten metal, and a heat-resistant and flame-resistant cover above the exit port of said pump and over at least a substantial portion of the cooler molten metal, the outlet of said inert gas bubble-actuated molten metal pump being directed toward an area of said cooler molten metal into which metal chips are introduced by said chip charger.

Also, in a metal-melting furnace, the following combination:

a charge well, an adjacent well, an inert gas bubble-actuated molten metal pump, having an inlet end in said adjacent well and an outlet end in said charge well, located between said adjacent well and said charge well, a metal chip charger for introducing metal chips into the charge well, and a heat-resistant and flame-resistant cover above the exit port of said pump and over at least a substantial portion of the charge well, the outlet of said inert gas bubble-actuated molten metal pump being directed toward an area of said charge well into which metal chips are introduced by said chip charger; such a combination wherein the pump comprises an elongated conveying conduit having a lower end and an upper end, at least a portion of said conduit being inclined upward from the horizontal; such a combination wherein said conveying conduit has an inert gas and molten metal inlet at or adjacent its lower end and an inert gas and molten metal outlet at its upper end; such a combination wherein said pump is set in a wall between a charge well and an adjacent well of said metal-melting furnace; such a combination wherein said pump is set at an angle in an opening in said wall with its lower end in said adjacent well and its upper end in said charge well; such a combination wherein said elongated conveying conduit is angled with an upper portion substantially horizontal and a lower portion extending downwardly at an angle to the horizontal; such a combination wherein said conveying conduit is molded in or routed out of a block of molten metal- and high temperature-resistant refractory material; such a combination wherein the refractory material is a graphite, ceramic, silica, or silicon carbide material; such a combination wherein the metal chip charger is a mass flow gravity feed metal chip charger; such a method wherein the cover is floated on the surface of the molten metal; and such a combination wherein the cover is a floating cover which floats upon the surface of the molten metal.

DESCRIPTION OF THE DRAWINGS

Reference is now made to the drawings, wherein

FIG. 3 is an enlarged view of a portion of FIG. 2, showing in greater detail the inert gas bubble-actuated molten metal pump, its location in a wall between the adjacent well and the charge well, and a portion of the cover over the surface of the molten metal mass in the charge well.

FIG. 4 is an end view of the apparatus of FIG. 3, viewed from the right-hand side of FIG. 3.

DETAILED DESCRIPTION OF THE INVENTION

Figure 1:
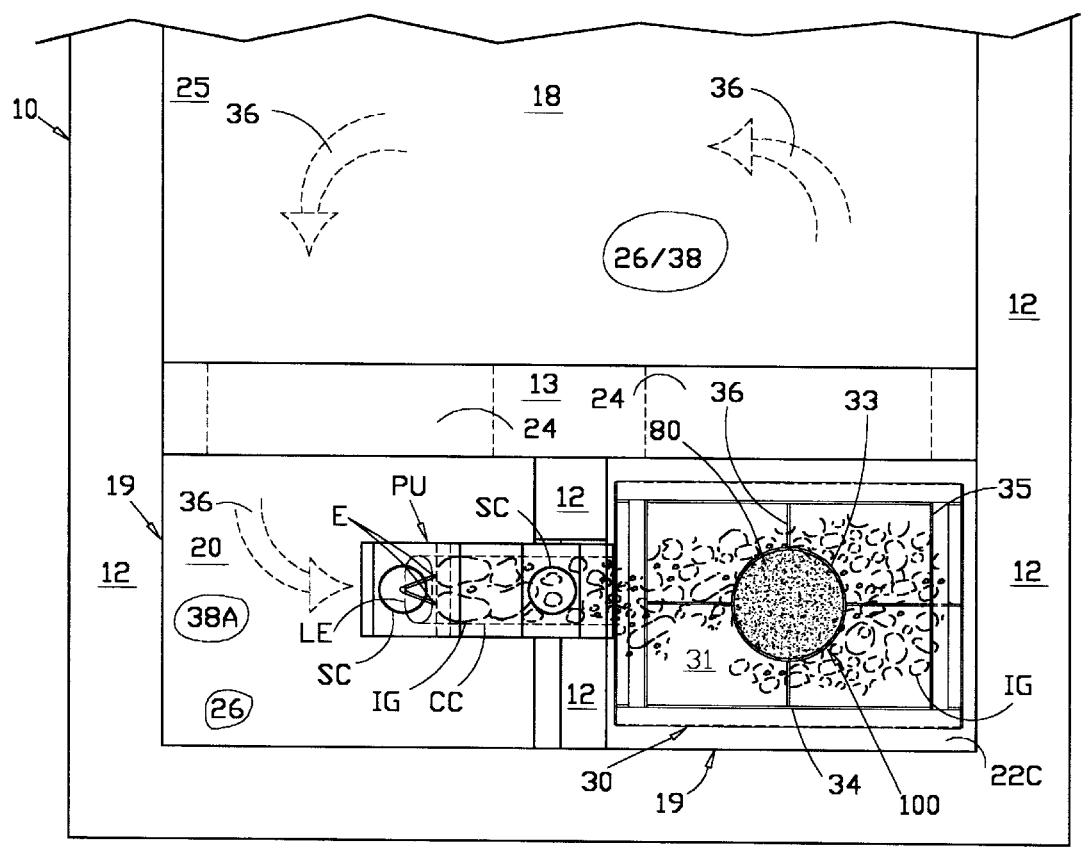
FIG. 1 is a top plan view of a metal-melting furnace, in this case a reverberatory furnace, partially schematic and partially in section, taken along line I—I of FIG. 2, with superstructure removed to show the apparatus required according to the invention and illustrating the method of the invention, including especially the various chambers or wells of the metal-melting furnace, a cover over a substantial portion of the charge well thereof, and an inert gas bubble-actuated molten metal pump between a well of the furnace other than the charge well, here an adjacent well, and the charge well itself.
Figure 2:
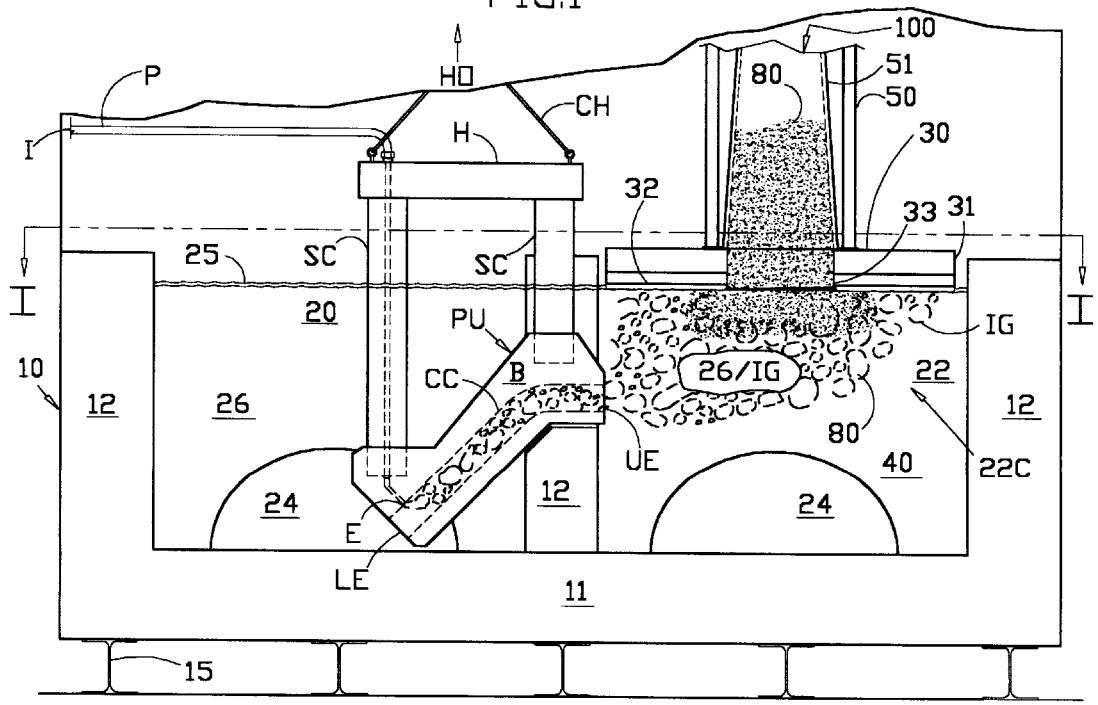
FIG. 2 is a front elevational view, partially schematic and partially in section, showing apparatus required according to the invention and illustrating the method of the invention in association with the charge well of the reverberatory furnace, a mass flow gravity feed metal chip charger and a charge-well being clear from this Figure, as well as an intermediate adjacent well and the inert gas bubble-actuated molten metal pump therebetween.

The present invention, in both its method and apparatus aspects, will be more readily understood from the following detailed description, particularly when taken in conjunction with the drawings, in which all of the significant parts are numbered or lettered and wherein the same numbers and letters are used to identify the same parts throughout.

A metal-melting furnace, as shown a reverberatory furnace, of refractory material or having the usual refractory lining and fired by combustion burners fed by natural gas or fuel oil which throw flames into the interior of main chamber 18 thereof through usual flame-introduction means, is shown in the FIGS. at 10.

The furnace well comprises bottom wall 11 and side or vertical walls 12 and 13, with a mass of molten metal, preferably and usually aluminum or magnesium or an aluminum or magnesium alloy, therein being shown at 26. The base portions 11 of the furnace may be supported on the underlying floor by means of I-beam supports 15, as shown. Main chamber 18 is provided with main chamber extensions 19 in the form of intermediate and adjacent well 20, which is usually referred to as the circulation well, and the charge well 22, connected with each other and with main chamber 18 by means of communicating passageways 24. Molten metal 26 is contained in main chamber 18 and is circulated from the hottest part thereof, indicated at 38, through intermediate well 20 into charge well 22 via communicating passageways 24. The necessary circulation is provided by means of inert gas bubble-actuated molten metal pump PU, located in an opening in wall 12 between intermediate and adjacent well 20 and charge well 22. Separate circulating means in what is normally circulation well 20 is not required. Conveying conduit CC is molded in or routed out of a block of refractory material B, which is resistant to the molten metal 26 and the high temperatures employed, the refractory material usually being of a graphite, ceramic, silica, or silicon carbide material. Elongated conveying conduit CC is angled with an upper portion substantially horizontal and a lower portion extending downwardly at an angle to the horizontal, the lower end thereof being designated LE and the upper end thereof being designated UE.

Also visible in the drawings are the molten metal oxide or dross 25, which ordinarily collects at the surface of the molten metal pool or bath or mass 26, this being shown as present in all of the wells of the metal-melting furnace 10. According to the flow path or pattern 36 in such a metal-melting furnace 10, as created by the action of the inert gas bubble-actuated molten metal pump PU and the conveying conduit CC thereof, circulation of molten metal 26 in furnace main chamber 18 is constantly and continuously moved from the hottest point 38 in main chamber 18, through communicating passageways 24, and especially by means of pump PU and conveying conduit CC thereof into intermediate and adjacent well 20 and thence into charge well 22. Due to its proximity to the hottest point in main chamber 18, the molten metal 26 in intermediate and adjacent well 20 is hotter, for example at point 38A, than the molten metal in charge well 22 in which coldest point 40 of the molten metal in the entire metal-melting furnace is located.

As shown, this coldest point 40 is at a point or at a point closely adjacent to the normal point of introduction of a charge of new or used unmelted chips 80 into charge well 22, as by a chip-charging means 100 of any suitable type, and the necessity of bringing hotter molten metal to this relatively cold charge well 22 by maintaining adequate circulation throughout the metal-melting furnace 10 and in all chambers thereof is well understood by one skilled in the art.

As shown, the chip-charging means 100 comprises a vertically disposed metal chip charging conduit 51 which is an integral part of mass flow gravity feed metal chip charger 50. Internal of the vertically disposed metal chip charging conduit 51 is located a new charge of metal chips 80, as fully disclosed in my earlier U.S. Pat. No. 5,407,462, which gravity feed charger 50 is disposed above an aperture 33 in flame-resistant and temperature-resistant cover 30, comprising an upper metal surface 31 which is provided with metal edging 34, angle iron supports 35, and flanges 36 and which advantageously has refractory material 32 secured to the flat steel plate 31 or clad thereto, or otherwise constituted as such a charge-well cover is described in my previous U.S. Pat. No. 5,211,744. Charge-well cover 30 preferably covers the entire upper surface of charge-well cavity 22C and the mass of molten metal 26 therein and in any event covers as much of the surface of charge-well cavity 22C and the mass of molten metal 26 therein as is possible and convenient, and in all cases is adapted to cover a substantial portion of the surface of charge well cavity 22C and the mass of molten metal 26 therein.

In a preferred embodiment, the cover 30 is a self-leveling floating cover which floats upon the surface of the molten metal mass 26 and, in such case, the weight of the cover is simply reduced to a point where the density of the cover 30 is sufficiently lower than that of the molten metal mass 26 so as to permit the cover 30 to float on top of the molten metal mass. Such objective is readily attained by employing more of refractory material 32 and less heavy material such as flat steel plate 31 so as to attain the desired relation of density of the cover 30 to the density of the molten metal mass 26 and, if desired, in at least some cases cover 30 may comprise only refractory material 32 since refractory board of improved stability and increased heat- and flame-resistance is now commercially available. If desired, the cover 30 may be lifted into and out of its position atop molten metal mass 26 by means of a chain-type mechanism and hoist, such as CH and HO, so as to permit ready cleaning of the underside of cover 30 and, in case the cover 30 is a floating cover, it simply floats up and down on top of the molten metal bath 26 regardless of the metal level in the furnace chamber. As a further preferred embodiment to facilitate attainment of the objectives of the present invention, the cover 30 may also be notched, if desired, so as to straddle the exit port UE of the pump PU and its conveying conduit CC so as to permit more efficient capture of the inert gas IG emerging from the said exit port UE of the pump PU.

The substantially vertical or in any case vertically disposed metal chip charging cylindrical conduit 51 of mass flow gravity feed charger 50 is as usual associated with and possibly connected to cover 30, and the bottom of the interior thereof communicates with central aperture 33 of cover 30, thereby allowing metal chips 80 to fall by the force of gravity through central aperture 33 in cover 30 into the molten metal mass 26 in charge well 22. Any other chip-charging means for introducing metal chips into the charge well of a metal-melting furnace may be employed instead of the mass flow gravity feed charger 50 shown in the drawings, always in conjunction with a cover 30 and always involving a suitable aperture or opening in cover 30 but not necessarily involving a central aperture such as central aperture 33 shown in the drawings in association with the mass flow gravity feed charger 50, such as the chip charger means of my prior U.S. Pat. Nos. 4,702,768, 4,872,907, or of course any variation of the mass flow gravity feed charger of my prior U.S. Pat. No. 5,407,462, the exact chip-charging means employed not being of the essence of the present invention, although a gravity feed charger 50 such as shown in the drawings and as further disclosed in detail in my prior U.S. Pat. No. 5,407,462 is preferred. In any event, fresh metal chips, whether new or used, are introduced into the molten metal mass 26 in charge well 22.

Returning to the inert gas bubble-actuated molten metal pump PU, as is usual the flow of molten metal 26 in the pump PU is effected by means of bubbles of inert gas IG introduced into the conveying conduit CC at or adjacent its lower end LE and rising up the incline therein to emerge at its upper end UE, at which point the hotter molten metal 26 and the inert gas IG, together referred to as effluent 26IG, in effect "shoot out" into the molten metal 26 in charge well 22, the outlet or upper end UE of the conveying conduit CC, and thus of the pump PU, being directed toward an area of the charge well 22 and the mass of molten metal 26 therein into which metal chips 80 are introduced by the chip charger 100, in this case by mass flow gravity feed charger 50. The entrance of the hotter molten metal 26 into the colder molten metal mass 26 of the charge well 22, inasmuch as it is directed toward the area of the molten metal mass 26 in charge well 22 into which the new charge of chips 80 is being introduced, raises the temperature in that area considerably and greatly assists with the melting of the new charge of chips 80 into the molten metal mass 26. In addition thereto, when the hotter molten metal 26 from intermediate well 20 impinges upon or comes into contact with the new charge of metal chips 80, the melting process is greatly facilitated. Further, as the bubbles of inert gas IG emerge from the upper end UE of the conveying conduit CC of pump PU and into the mass of molten metal 26 in charge well 22, the bubbles of inert gas IG are released and rise upwardly but, instead of escaping, at least a substantial portion of the inert gas IG is captured in charge well 22 beneath cover 30 and there provides a non-oxidizing atmosphere in the form of bubbles and a layer of inert gas IG at the surface of the said molten metal 26 in the charge well 22 and beneath the cover 30. Thus, the same inert gas IG used for actuation of the molten metal pump PU is used to provide a non-oxidizing atmosphere beneath the cover 30 in charge well 22.

The lower end of the inert gas supply or feed line in the form of pipe P may not be or may be bifurcated (as shown) so as to provide a plurality of exit ports E for the inert gas, thereby providing a plurality of streams of inert gas bubbles IG within the conveying conduit CC for better actuation of the molten metal pump PU, if desired, or a similar result can be attained by use of a plurality of pipes P, or by the use of a multiple gas manifold, although this latter is usually employed only with a plurality of conveying conduits CC as shown in my U.S. Pat. No. 5,203,910.

As shown in the drawings, the gas feed means comprises inlet port I and pipe P, having an exit port E at its lower end, which communicates with the lower end LE of the conveying conduit CC of pump PU, the pipe P being encased in a supporting column SC and the supporting block B of refractory material also being attached to supporting columns SC, the connections between support columns SC and block B being immaterial so long as they are durable, as by suitable molten-metal and heat-resistant clamps or welds, by press fitting, by welding to metal inserts, or the like. Since the connecting means are immaterial, they are not shown in the drawings. The support columns SC are supported from hanger H, which is in turn supported by chain or cable CH connections to a ring or hook, in turn suitably connected to a hoist HO, not shown, for rapid and convenient introduction into and removal of the pump PU and its auxiliary fittings, supports, and inert gas feed line as a unit from their operative location between wells of the metal-melting furnace.

OPERATION

In operation, molten metal from the main chamber 18 of the metal-melting furnace 10 is circulated, with the assistance of inert gas bubble-actuated molten metal pump PU, which is preferably located between what is usually the "circulation" well 20 of the metal-melting furnace and the charge well 22 of the metal-melting furnace, and in any event in any well or between any wells of the metal-melting furnace, including the charge well of the metal-melting furnace. As shown, the pump PU is located in an opening in a wall 12 between an intermediate well 20 adjacent to the charge well 22 wherein the molten metal 26, coming directly from the main chamber 18, is hotter than it is in the charge well 22, where a new charge of metal chips 80 is periodically or continuously being introduced. The inert gas bubbles IG actuating, propelling, or driving the pump PU enter the conveying conduit CC at the lower end LE thereof and exit at the upper end UE thereof, the inert gas IG provided by gas feed means including inlet port I, pipe P, and exit port E, entering the pump PU and the conveying conduit CC thereof at or near the lower end LE thereof. Exiting from the upper end UE of the pump PU is a combination 26IG of the molten metal and the inert gas bubbles propelling the same. The upper end UE or exit port of the pump PU and the conveying conduit CC thereof is directed toward the area of the molten mass in the charge well into which a new charge of metal chips 80 is introduced and thus into contact with the said metal chips. Since the molten metal 26 entering from the well 20 other than the charge well of the furnace, in this case the intermediate adjacent well 22, is at a higher temperature and hotter than the molten metal 26 in the charge well 22 itself, and certainly has a higher temperature than the new charge of metal chips 80 being introduced by the metal chip charger 100, as shown the preferred mass flow gravity feed furnace charger 50, although the same principles are in effect and the same results are attained regardless of the type of charger employed, the new charge of metal chips 80 being fed into the charge well 22 of the metal-melting furnace, upon subjection to contact with the hotter molten metal, melts more rapidly into the molten metal mass 26 in the charge well 22 of the furnace. In addition, rather than being wasted to the outside, the inert gas IG used to actuate the inert gas bubble-molten metal pump PU is captured in the charge well 22 beneath the charge well-cover 30, which may conveniently be a floating cover, thereby providing a non-oxidizing atmosphere of inert gas IG at the surface of the molten metal mass 26 in the charge well 22 and beneath said cover 30.

Thus, according to the method and employing the apparatus of the present invention, the necessary circulation of molten metal in the metal melting furnace is efficiently effected, the molten metal is brought from a well or chamber of the metal-melting furnace wherein the molten metal is at a temperature higher than that of the molten metal in the charge well itself and considerably hotter than the new charge of metal chips being fed into the charge well of the metal-melting furnace and, the exit end of the pump PU and the conveying conduit CC thereof being pointed at the area into which the new charge of metal chips is introduced, and thus being directed into contact with the new charge of metal chips, greatly assists in the more rapid melting of the new charge of metal chips into the molten metal mass in the charge well. In addition, the inert gas employed is used not only as the actuator or propellant for the inert gas bubble-molten metal pump PU but, in combination with the heat-resistant and flame-resistant cover over at least a substantial portion of the charge well, is captured beneath the said cover and utilized to create the highly desirable non-oxidizing atmosphere at the surface of the molten metal in the charge well and beneath the said cover, thereby presenting an overall highly efficient and yet highly economical arrangement of apparatus and method for the circulation of molten metal throughout the various chambers of the metal-melting furnace and particularly from a chamber wherein it is at a hotter temperature than in the charge well into the charge well itself, for the more rapid melting of a new charge of metal chips into the molten metal mass or pool in the charge well, and for the establishment of a non-oxidizing atmosphere at the surface of the molten metal mass in the charge well and beneath the heat-resistant and flame-resistant cover over the surface of the molten metal mass therein.

IN GENERAL

The method and apparatus of the present invention is particularly adapted for use in connection with the melting and recycling of nonmagnetic metal scrap such as brass, aluminum, aluminum alloys, and the like, and such non-magnetic metal scrap may conveniently be separated from a mass of metal scrap including also ferrous, ferric, or other magnetic chips by the employment of magnetic separation means, as is now well known and established in the art.

The conveying conduit of the invention as well as the gas feed means of the invention are generally constructed of high-temperature molten metal-resistant ceramic, graphite, silica, or silicon carbide or the like, and the hangers and support columns supporting the same within the metal mass are bonded thereto as by welding, clamping, or ceramic or adhesive bonding around the exterior thereof or in some cases may be molded into the ceramic, graphite, silica, or silicon carbide material of construction, or in some cases may even be of mild or stainless or such steel coated or plated with a refractory material.

As used herein, the term "metal chips" means metal chips or scrap of any type or description as is conventionally used in the art for charging into the charge well of a metal melting furnace, and includes aluminum, magnesium, titanium, brass, iron, or steel, or an alloy thereof, or a metal for alloying one of said metals.

Where, in this Specification and claims, molten metal, a molten metal mass or pool, and "metal chips" are referred to, the type of metal comprising the molten metal pool has already been described, and the term "metal chips" is to be understood as encompassing metal chips of various almost unlimited proportions, configurations, and dimensions, but particularly as including small pieces and/or particles, likewise of extremely variable dimensions, and in general the term "metal chips" is employed herein as having the usual meaning to one skilled in the art, being inclusive not only of parts, pieces, particles, and fragments of the usual type from scrap, but also previously-unused metal in standard or odd configurations remaining from previous molding, extruding, casting, rolling, or like metal processing operations, and it goes without saying that inconveniently large pieces can be reduced in size in any convenient manner and employed as metal chips and that, accordingly, any suitable metal, whether scrap or otherwise, can be converted into chips and employed in the method and apparatus of the invention, whether new metal or previously used metal, including even and especially new and used aluminum sheet and can scrap, when it is determined that such further processing into new metal is required or desired by the operator.

It is thereby seen from the foregoing that the objects of the present invention have been accomplished and that a novel, efficient, and economic method and apparatus have been provided, all in accord with the Objects of the Invention and the Summary of Invention as set forth herein-before.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

I claim:

1. A method comprising the following steps: providing an inert gas bubble-actuated molten metal pump in a section of a metal-melting furnace containing hotter molten metal, and providing a section of a metal-melting furnace containing cooler molten metal, directing hotter molten metal emerging from the pump into contact with a charge of metal chips being introduced into the cooler molten metal to assist in more rapid melting of the chips, providing a heat-resistant and flame-resistant cover above the exit port of said pump and over at least a substantial portion of the molten metal into which the chips are being charged, and capturing inert gas used as actuating agent in the molten metal pump beneath said cover to provide a non-oxidizing atmosphere at the surface of said molten metal into which said chips are being charged and beneath said cover.

2. A method comprising the following steps: providing an inert gas bubble-actuated molten metal pump between a first section of a metal-melting furnace which contains hotter molten metal, and a second section of a metal-melting furnace containing cooler molten metal, directing hotter molten metal emerging from the pump from said first section into contact with a charge of metal chips being introduced into said second section to assist in more rapid melting of the chips, providing a heat-resistant and flame-resistant cover above the exit port of said pump and over at least a substantial portion of the molten metal in the second section, and capturing inert gas used as actuating agent in the molten metal pump beneath said cover to provide a non-oxidizing atmosphere at the surface of said molten metal in said second section and beneath said cover.

3. A method of claim 2 wherein the pump comprises an elongated conveying conduit having a lower end and an upper end, at least a portion of said conduit being inclined upward from the horizontal.

4. A method of claim 3 wherein flow of molten metal in said conveying conduit is effected by means of inert gas introduced into said conveying conduit at or adjacent its lower end and rising up the incline therein to emerge at its upper end.

5. A method of claim 2 wherein said pump is set in a wall between a charge well and adjacent well in said metal-melting furnace.

6. A method of claim 5 wherein said pump is set at an angle in an opening in said wall with its lower end submerged in molten metal in said adjacent well and its upper end in molten metal in said charge well.

7. A method of claim 3 wherein said elongated conveying conduit is angled with an upper portion substantially horizontal and a lower portion extending downwardly at an angle to the horizontal.

8. A method of claim 2 wherein the molten metal and the metal chips charged into the charge well comprise aluminum, magnesium, titanium, brass, iron, or steel, or an alloy thereof, or a metal for alloying one of said metals.

9. A method of claim 2 wherein the charge of metal chips is provided by a mass flow gravity feed metal chip charger.

10. In a metal-melting furnace, the following combination:

a first section for containing hotter molten metal, a second section for containing cooler molten metal, an inert gas bubble-actuated molten metal pump, having an inlet end in said first section and for location in said hotter molten metal when contained in said first section and an outlet end in said second section and for location in said cooler molten metal when contained in said second section, located between the said two sections of said metal-melting furnace, a metal chip charger for introducing metal chips into the second section when said cooler molten metal is contained therein, and a heat-resistant and flame-resistant cover above the exit port of said pump and over at least a substantial portion of said second section and over a substantial portion of the cooler molten metal when contained therein, the outlet of said inert gas bubble-actuated molten metal pump being directed toward an area of said second section and of said cooler molten metal when contained therein into which metal chips are introduced by said chip charger.

11. In a metal-melting furnace, the following combination:

a charge well, an adjacent well, an inert gas bubble-actuated molten metal pump, having an inlet end in said adjacent well and an outlet end in said charge well, located between said adjacent well and said charge well, a metal chip charger for introducing metal chips into the charge well, and a heat-resistant and flame-resistant cover above the exit port of said pump and over at least a substantial portion of the charge well, the outlet of said inert gas bubble-actuated molten metal pump being directed toward an area of said charge well into which metal chips are introduced by said chip charger.

12. A combination of claim 10 wherein the pump comprises an elongated conveying conduit having a lower end and an upper end, at least a portion of said conduit being inclined upward from the horizontal.

13. A combination of claim 12 wherein said conveying conduit has an inert gas and molten metal inlet at or adjacent its lower end and an inert gas and molten metal outlet at its upper end.

14. A combination of claim 10 wherein said pump is set in a wall between a charge well and an adjacent well of said metal-melting furnace.

15. A combination of claim 14 wherein said pump is set at an angle in an opening in said wall with its lower end in said adjacent well and its upper end in said charge well.

16. A combination of claim 12 wherein said elongated conveying conduit is angled with an upper portion substantially horizontal and a lower portion extending downwardly at an angle to the horizontal.

17. A combination of claim 13 wherein said conveying conduit is molded in or routed out of a block of molten metal- and high temperature-resistant refractory material.

18. A combination of claim 17 wherein the refractory material is a graphite, ceramic, silica, or silicon carbide material.

19. A combination of claim 10 wherein the metal chip charger is a mass flow gravity feed metal chip charger.

20. A method of claim 1 wherein the cover is floated on the surface of the molten metal.

21. A combination of claim 10 wherein the cover is a floating cover which floats upon the surface of the molten metal when contained in said second section.

* * * * *